(12) United States Patent
Pearson (10) Patent No.: US 11,358,659 B2
(45) Date of Patent: Jun. 14, 2022

(54) SAFETY APPARATUS FOR A FIFTH WHEEL COUPLING

(71) Applicant: JPH3 Pty Ltd, Port Macquarie (AU)

(72) Inventor: James Gordon Pearson, Port Macquarie (AU)

(73) Assignee: JPH3 Pty Ltd, Port Macquarie (AU)

( * ) Notice: Subject to any disclaimer, the term of this patent is extended or adjusted under 35 U.S.C. 154(b) by 748 days.

(21) Appl. No.: 16/163,154

(22) Filed: Oct. 17, 2018

(65) Prior Publication Data

US 2019/0367106 A1    Dec. 5, 2019

(30) Foreign Application Priority Data

May 30, 2018  (AU) .................................. 2018901925

(51) Int. Cl.
*B62D 53/08*  (2006.01)
*B62D 53/10*  (2006.01)
(Continued)

(52) U.S. Cl.
CPC ......... *B62D 53/0878* (2013.01); *B60D 1/015* (2013.01); *B60D 1/28* (2013.01);
(Continued)

(58) Field of Classification Search
CPC .... B62D 53/06; B62D 53/08; B62D 53/0878; B62D 53/10; B60D 1/015; B60D 1/242;
(Continued)

(56) References Cited

U.S. PATENT DOCUMENTS 2,387,625 A * 10/1945 Walther ................. B62D 53/10
                                                    340/431
2,730,377 A *  1/1956 Fuschi ................... B62D 53/10
                                                    280/432

(Continued)

FOREIGN PATENT DOCUMENTS

WO       2003020561 A1     3/2003

OTHER PUBLICATIONS

International-type Search from Australian App. No. 2018901925 (filed May 30, 2018) dated Jul. 27, 2018.

*Primary Examiner* — Minnah L Seoh
*Assistant Examiner* — Maurice L Williams (57) ABSTRACT

A safety apparatus for a fifth wheel coupling having locking jaws arranged to detachably couple to a trailer having spring applied air brakes, the fifth wheel coupling comprising a locking component that is moveable between a first position whereat the locking jaws are in a coupled state and a second position whereat the locking jaws are in a decoupled state, the safety apparatus comprising a pneumatic valve arrangement pneumatically coupled to both a constant air pressure supply and an air park brake supply that supplies pressurised air to the spring applied air brakes, and a mechanical actuator mechanically coupled to the locking component and configured to mechanically actuate the pneumatic valve arrangement when the locking component moves from the first position to the second position, thereby causing the pneumatic valve arrangement to block flow in an air park brake supply line for preventing the spring applied air brakes from releasing.

17 Claims, 6 Drawing Sheets

(51) Int. Cl.
    *B62D 53/06* (2006.01)
    *B60D 1/28* (2006.01)
    *B60D 1/01* (2006.01)
    *B60D 1/36* (2006.01)

(52) U.S. Cl.
    CPC ............. *B62D 53/06* (2013.01); *B62D 53/10* (2013.01); *B60D 1/363* (2013.01)

(58) Field of Classification Search
    CPC .......... B60D 1/28; B60D 1/363; B60D 1/366; B60D 1/62
    See application file for complete search history.

(56) References Cited

U.S. PATENT DOCUMENTS

| | | | | |
|---|---|---|---|---|
| 2,811,374 A * | 10/1957 | Fuschi | ................... | B62D 53/10 280/432 |
| 2,879,081 A * | 3/1959 | Keehn | ................ | F16L 55/1007 137/351 |
| 2,998,267 A * | 8/1961 | Zajac | ................... | B62D 53/12 280/427 |
| 5,069,472 A | 12/1991 | Parr et al. | | |
| 5,690,347 A * | 11/1997 | Juergens | ................... | B60T 7/12 280/432 |
| 5,775,712 A * | 7/1998 | Link | ....................... | B60Q 1/46 280/422 |
| 6,100,794 A | 8/2000 | Hillier | | |
| 9,027,949 B2 | 5/2015 | Reimer | | |
| 9,975,588 B2 | 5/2018 | Jembari et al. | | |
| 10,661,622 B2 * | 5/2020 | Keatley | ............... | B62D 53/0857 |
| 10,676,142 B2 * | 6/2020 | Hungerink | ............ | B62D 53/10 |
| 10,780,872 B2 * | 9/2020 | Kasper | .................... | B60T 8/172 |
| 10,850,782 B2 * | 12/2020 | Keatley | ................. | B62D 53/08 |
| 2011/0025482 A1 * | 2/2011 | Alguera | ................ | B60D 1/62 340/431 |
| 2011/0147142 A1 * | 6/2011 | Standen | ................ | B62D 53/10 188/152 |
| 2014/0300081 A1 * | 10/2014 | Shirk, Jr. | ............... | B62D 53/10 280/432 |
| 2015/0343865 A1 * | 12/2015 | Hile | ....................... | B62D 53/10 280/432 |
| 2016/0059649 A1 | 3/2016 | Dolesh | | |
| 2016/0075197 A1 * | 3/2016 | Coleman | ............ | B62D 53/0864 280/433 |
| 2016/0339836 A1 * | 11/2016 | Sibley, Jr. | ............ | H05B 47/115 |
| 2019/0064835 A1 * | 2/2019 | Hoofard | ................ | B60D 1/246 |
| 2019/0084534 A1 * | 3/2019 | Kasper | .................... | G08G 1/22 |
| 2019/0225286 A1 * | 7/2019 | Schutt | ....................... | G01L 1/12 |

* cited by examiner

SAFETY APPARATUS FOR A FIFTH WHEEL COUPLING

CROSS-REFERENCE TO RELATED APPLICATIONS

This application claims the benefit of, and hereby incorporates by reference for all purposes the entirety of, Australian Provisional Patent Application No. 2018901925, filed May 30, 2018.

TECHNICAL FIELD

This disclosure relates to a safety apparatus for a fifth wheel coupling.

BACKGROUND

Fifth wheel couplings (also known as fifth wheel hitches) are commonly employed for securing a trailer to a tractor unit, such as a prime mover, tanker, camper trailer, pick-up truck (also commonly referred to as a "utility vehicle" or "ute" in Australia), or other such vehicle capable of pulling a trailered load. The fifth wheel coupling is typically mounted at the rear of the tractor unit (e.g. via a pair of trunnions), or within the bed of a pick-up style truck.

The most common form of fifth wheel coupling employs spring loaded jaws that close around a kingpin that protrudes from an underside of the trailer. When the jaws are in the closed "coupled" state, a jaw-straddling yoke is moved into a secure position preventing the jaws from separating. An auxiliary lock is configured to bear on the jaw straddling yoke to inhibit it from unintentionally moving to a jaw releasing position.

While fifth wheel couplings have proven to be particularly reliable and stable for towing, several safety issues arise when the trailer unit is de-coupled. Firstly, it is not uncommon for an operator to forget to disconnect various pneumatic hose lines and cables that connect the trailer to the truck after the fifth wheel coupling has been de-coupled. If the driver pulls away from the trailer without disconnecting these lines and cables, they can break, causing inconvenience and appreciable cost to have them repaired or replaced. Further, if the driver neglects to disconnect the pressurised park break air supply line, the trailer can readily move off on its own accord, particularly if parked on an inclined surface. As persons skilled in the art will appreciate, this has a high likelihood of causing an unnecessary accident.

SUMMARY

This summary represents non-limiting embodiments of the disclosure.

In a first aspect, embodiments are disclosed of a safety apparatus for a fifth wheel coupling having locking jaws arranged to detachably couple to a trailer having spring applied air brakes, the fifth wheel coupling comprising a locking component that is moveable between a first position whereat the locking jaws are in a coupled state and a second position whereat the locking jaws are in a decoupled state, the safety apparatus comprising an actuator arrangement operable to mechanically couple to the locking component such that when the locking component moves from the first position to the second position, the actuator arrangement is configured to prevent a pressurised air supply from reaching the spring applied air brakes for releasing the spring applied air brakes.

In an embodiment, the actuator arrangement comprises a pneumatic valve assembly that is configured to pneumatically couple to an air park brake supply line which supplies pressurised air to the spring applied air brakes whilst ever the park brake is not engaged; and wherein, when actuated, the valve assembly is controlled to interrupt the air supply.

In an embodiment, the actuator arrangement is further configured such that when the locking component returns to the first position, the valve assembly is controlled to allow the pressurised air supply to reach the air brakes ensuring that they are released while ever the park brake remains disengaged.

In an embodiment, the pneumatic valve assembly comprises a pneumatic shut off valve (PSOV) having an input port pneumatically coupled to a constant air pressure supply and an output port pneumatically coupled to a pneumatic inversion valve (PIV) configuration that is disposed between the air brake air supply and a spring valve coupled to the air brakes.

In an embodiment, the PSOV is a normally closed PSOV and wherein the PIV configuration comprises a first PIV having an input port pneumatically coupled to the output port of the PSOV and an output port pneumatically coupled to a control valve of a second PIV and whereby an input port of the second PIV is pneumatically coupled to the air brake air supply and an output port of the second PIV is pneumatically coupled to an air supply input for the air brakes.

In an embodiment, the output port of the second PIV is pneumatically coupled to a control input for the first PIV.

In an embodiment, the constant air pressure supply is a protected supply.

In an embodiment, the locking component comprises an auxiliary lock which is pivotally mounted inside a body of the fifth wheel coupling.

In an embodiment, the auxiliary lock is movable between the coupled and uncoupled state by way of a cam plate and wherein when in the coupled state the auxiliary lock is configured to bear on a locking yoke so as to prevent lateral displacement of the locking yoke.

In an embodiment, the mechanical actuator is a rotary actuator connected to the PSOV and wherein the rotary actuator is coupled to the auxiliary lock by way of a lever.

In an embodiment, the lever comprises one or more rose joints that couple to at least one of the mechanical actuator and the auxiliary lock.

In an embodiment, the PSOV is located within a body of the fifth wheel coupling.

In an embodiment, the pneumatic valve assembly further comprising a pressure switch that, when actuated, is configured to either open or close an electrical circuit in an alarm circuit causing an alert indicator electrically coupled to the alarm circuit to output at least one of an audible and visible alarm and wherein actuation of the mechanical actuator results in the pressure switch being be actuated.

In an embodiment, the pressure switch comprises a pneumatic pressure switch that is actuated by air pressure output through the output port of the PSOV.

In an embodiment, the alert indicator is positioned such that it is noticeable in a cockpit of the tractor.

In an embodiment, the alarm circuit is electrically connected to an electrical socket located on the tractor and wherein the alarm circuit is configured such that insertion of a socket attached to a powered trailer lighting electrical cable into the socket ceases the audible and/or visible alarm.

In accordance with a second aspect, there is provided a safety apparatus for a fifth wheel coupling located on a tractor unit and having locking jaws arranged to detachably couple to a trailer, the fifth wheel coupling comprising a locking component that is moveable between a first position whereat the locking jaws are in a coupled state and a second position whereat the locking jaws are in a decoupled state, the safety apparatus comprising an alarm circuit electrically coupled to an actuator that is in turn configured to mechanically couple to the locking component such that when the locking component moves from the first position to the second position, the actuator causes the alarm circuit to provide power to an indicator that provides at least one of an audible and visible indication that can be observed in a cockpit of the tractor unit.

In an embodiment, the alarm circuit is the alarm circuit as described in accordance with the first aspect.

In accordance with a third aspect, there is provided a safety apparatus for a fifth wheel coupling mounted to a tractor unit and having locking jaws arranged to detachably couple to a trailer, the fifth wheel coupling comprising a locking component that is moveable between a first position whereat the locking jaws are in a coupled state and a second position whereat the locking jaws are in a decoupled state, the safety apparatus comprising an actuator arrangement operable to mechanically couple to the locking component such that when the locking component moves from the first position to the second position, the actuator arrangement is configured to (a) cause spring applied air brakes attached to the trailer to be engaged; and (b) output an audible and/or visual alarm that can be observed from a cabin of the tractor unit.

In accordance with a fourth aspect, there is provided a safety apparatus for a fifth wheel coupling having locking jaws arranged to detachably couple to a trailer having spring applied air brakes, the fifth wheel coupling comprising a moveable auxiliary locking component that, when in an engaged position, prevents the locking jaws from opening and wherein the auxiliary locking component can only move into the engaged position once the jaws have successfully closed, the safety apparatus comprising an auxiliary park brake assembly that is pneumatically coupled to a supply line for providing pressurised air to the spring applied air brakes for releasing the brakes, the auxiliary park brake assembly comprising an actuator that is mechanically coupled to the moveable auxiliary locking component such that the actuator controls the auxiliary park brake assembly to interrupt the supply of pressurised air to the spring applied air brakes until such times as the moveable auxiliary locking component has moved into the engaged state.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

Figure 1:
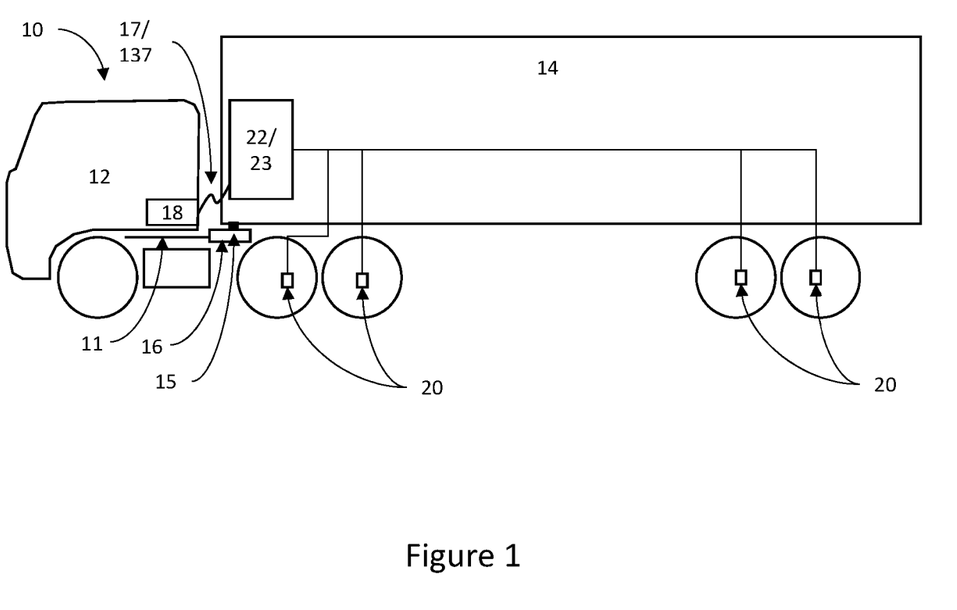
FIG. 1 is a schematic of a tractor unit fitted with a safety apparatus in accordance with an embodiment of the present invention.

With reference to FIG. 1, there is shown a schematic of a tractor unit suitable for use with an embodiment of the present invention. According to the illustrated embodiment, the tractor unit 10 is in the form of a prime mover and will hereafter be referred to as such. The prime mover 10 comprises a cabin 12 (hereafter "cab"). The prime mover 10 is connected to a trailer 14 by way of a fifth wheel coupling 16 mounted to the chassis of the prime mover 10 at the rear of the cab 12.

The trailer 14 has a kingpin 15 protruding from an underside thereof toward the front end of the trailer. The kingpin 15 can be removably coupled to the fifth wheel coupling 16 in a conventional manner. The trailer 14 is also fitted with a parking brake system employing multiple spring applied air brakes (hereafter trailer park brakes 20). As persons skilled in the art will appreciate, such park brakes employ powerful springs for holding the brakes on, with air pressure being applied for releasing the parking brake.

In more detail, the parking brake system comprises a pneumatic circuit 22 that is pneumatically/fluidly coupled to an output of an air compressor 18. According to a particular embodiment, the air compressor 18 is driven by an engine of the prime mover 10 and supplies compressed air to an air tank that stores the air for supply to the pneumatic circuit 22. The air tank may be mounted to the chassis 11 of the prime mover 10. One or more trailer park brakes 20 are pneumatically coupled to the circuit 22. Each trailer park brake 20 comprises a spring which biases a brake pad towards contact with a brake drum or disc. The brake pad can be moved into a disengaged state (i.e. against the bias of the spring) by pressurised air. A valve 23 in the pneumatic circuit 22 can be controlled to either admit the pressurised air (i.e. stored in the air tank) to the trailer park brakes 20 for releasing the parking brake, or to release/vent the pressurised air from the circuit 22 for applying the parking brake. An air line 17 connects the circuit 22 to the air tank supply on the prime mover 10. The valve 23 is typically controlled by a lever or button within the cab 12. It will be understood that any suitable configuration for a spring applied parking brake system may be suitable for use with the present invention, provided that the system is configured to accept a pressurised supply of air for releasing the parking brakes.

Figure 2:
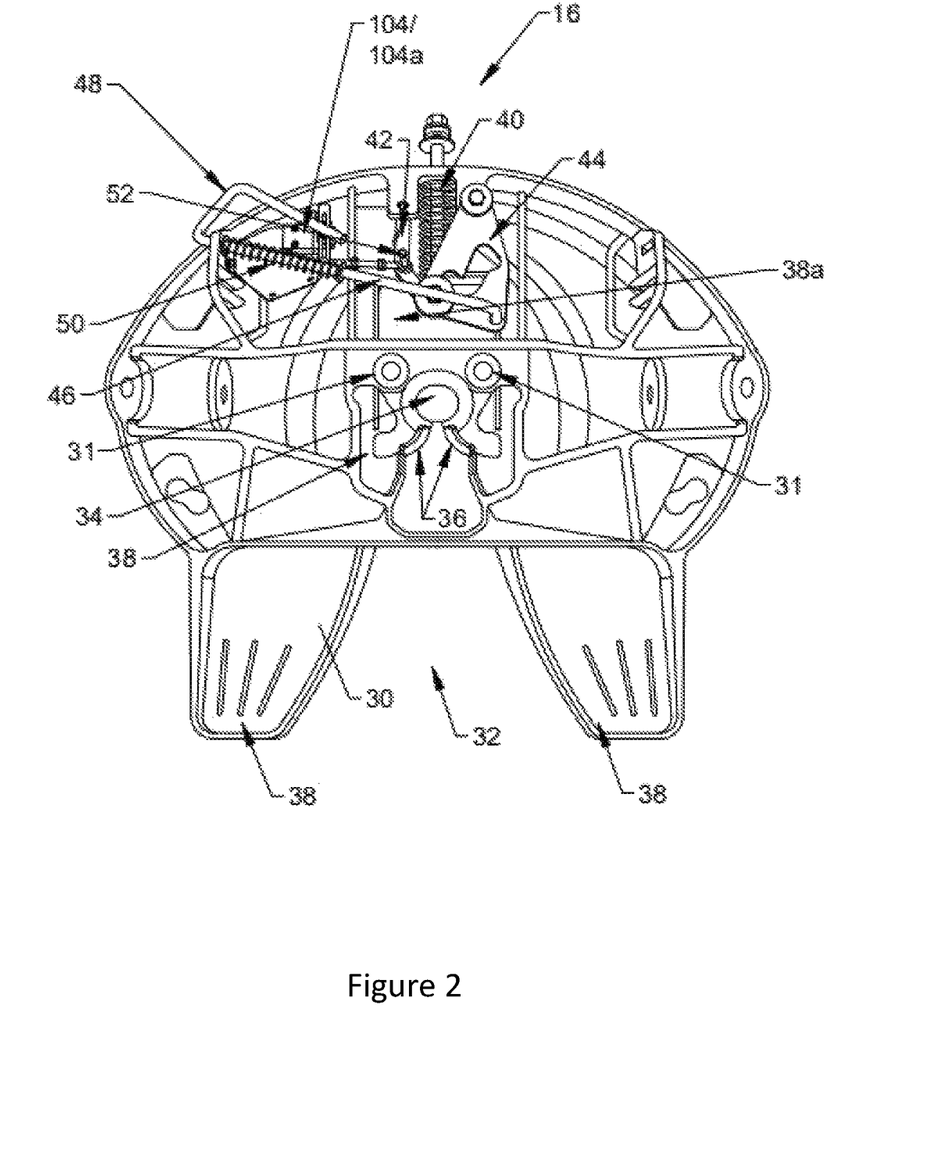
FIG. 2 depicts the internals of a fifth wheel coupling in a coupled state and incorporating an actuator in accordance with an embodiment of the present invention.
Figure 3:
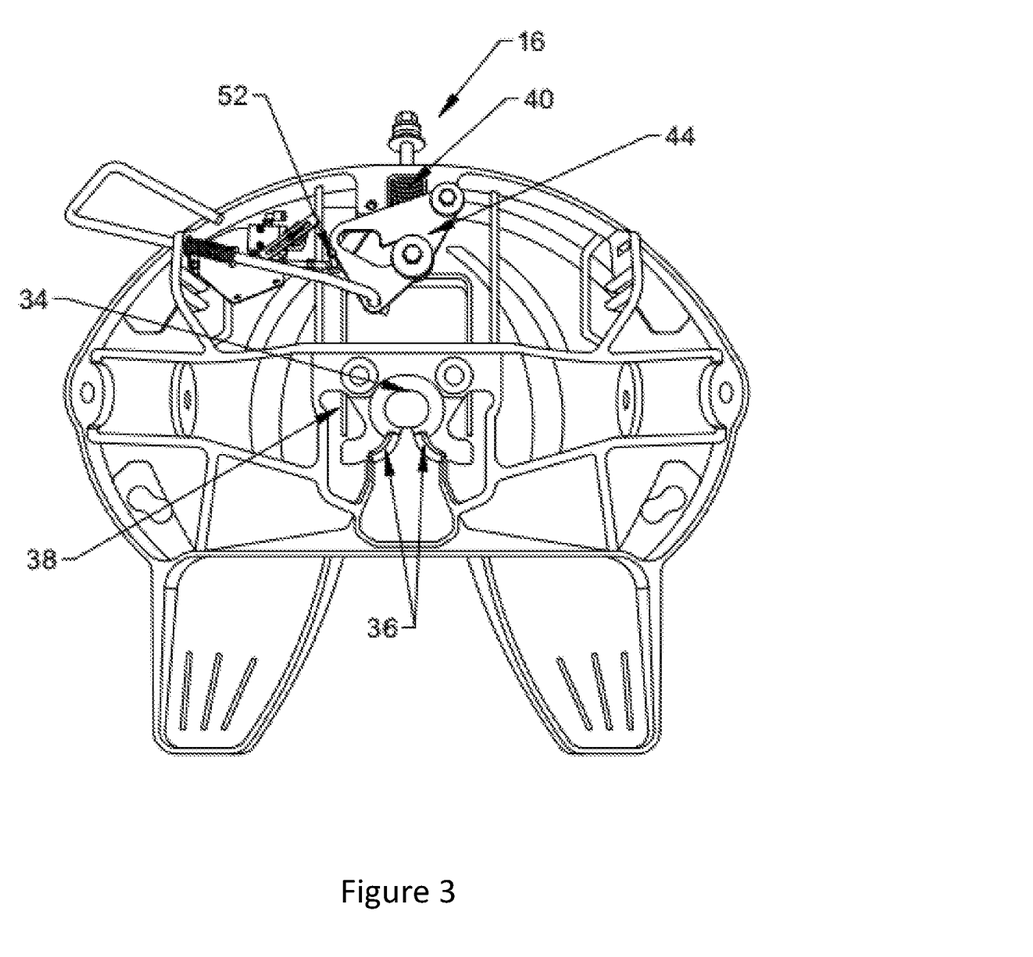
FIG. 3 depicts the fifth wheel coupling of FIG. 2 in a de-coupled state, in accordance with an embodiment of the present invention.

The fifth wheel coupling 16 will now be described in more detail with reference to FIGS. 2 and 3, which depict the internals of the coupling 16 from underneath. FIG. 2 depicts the coupling 16 in a coupled state (i.e. for securing the trailer 14), while FIG. 3 depicts the coupling 16 in a released or "decoupled" state (i.e. for releasing the trailer 14 and ready for re-coupling).

As shown, the coupling 16 comprises a turntable body 30 having a divided rear portion straddling a tapered, rearwardly oriented throat 32 and blind mouth 34. The body 30 has a pair of sloping rearward projecting ramps 38, which straddle and define the throat 32 which leads to the mouth 34.

A kingpin locking mechanism comprises a pair of pivotal locking jaws 36 which form the blind mouth 34 in which the kingpin 15 is received and retained (when in the coupled state). The jaws 36 are pivotally mounted to the body 30 via pivot pins 31. In use, the jaws 36 are adapted to mate with a smaller diameter neck portion of the kingpin 15.

A U-shaped yoke 38 is slidingly mounted inside the body 30 and moveable between a locking position (as shown in FIG. 2) for preventing the jaws 36 from opening, to a releasing position (FIG. 3) whereby the jaws 36 are allowed to open. The yoke 38 is biased toward the locking position by way of a compression coil spring 40 and by an auxiliary lock 42. The auxiliary lock is pivotally mounted to the body 30 and is biased to pivot against the cross leg 38a of the yoke 38, as shown in FIG. 2. In this manner, a distal portion of the auxiliary lock 42 is adapted to bear on the cross leg 38a preventing un-intentional displacement of the yoke 38 to the releasing position, which may result in the jaws 36 opening. This will hereafter be referred to as the auxiliary lock engaged state. It will be understood that the auxiliary lock 42 can only reach the lock engaged state once the jaws have successfully closed, thereby allowing the yoke 38 to move into the locking position.

A cam plate 44 is connected to both the spring 40 and a pull rod 46 that terminates in a handle 48. When the coupling 16 is in the coupled state (see FIG. 2), the cam plate 44 does not apply any significant rearward or forward force. The pull rod 46 is biased to the locked position (as per FIG. 2) by way of a compression coil spring 50.

Pulling the handle 48 causes the cam plate 44 to be rotated, in turn compressing the spring 40 thereby causing the yoke 38 to move rearwardly into the releasing position shown in FIG. 3. At the same time, the cam plate 44 laterally deflects a cam follower pin 52 projecting downwardly from a body of the auxiliary lock 42. This in turn causes the auxiliary lock 42 to be deflected out of the path of the yoke 38, allowing it to freely travel to its releasing position as shown in FIG. 3. This will hereafter be referred to as the auxiliary lock disengaged state.

The afore-described fifth wheel coupling configuration is described in detail in U.S. Pat. No. 4,428,595 and Canadian Patent No. 02334436, the contents of which are each incorporated herein by reference. Additional details of the prime mover 10, trailer 14, fifth wheel coupling 16 and park braking system are omitted for ease of illustration and do not in any way impact on the operational aspects of the invention as described herein.

Embodiments of the present invention relate to a safety apparatus that is mechanically coupled to the fifth wheel coupling 16 for providing various safety functions that may minimise the risk of injury and equipment damage.

More particularly, the safety apparatus comprises an auxiliary park brake assembly 102 having an actuator 104a that is mechanically coupled to a locking component of the fifth wheel coupling 16. Importantly, the auxiliary park brake assembly 102 of the present invention will only allow the trailer park brakes 20 to release once the trailer 14 has been successfully "hooked up" to the fifth wheel coupling 16. In other words, if the hook up has not been successfully carried out (i.e. such that the auxiliary lock 42 has not moved completely to the engaged state ensuring that the jaws 36 are locked in place around the kingpin 15 of the trailer 14), the auxiliary park brake assembly will prevent pressurised air from reaching the trailer park brakes 20, ensuring that they remain engaged. Once correctly hooked up, the auxiliary park brake assembly 102 allows pressurised air to again flow to the trailer park brakes 20, in turn allowing them to release.

The auxiliary park brake assembly 102 is further configured such that when the state of the coupling 16 changes from a coupled state to a de-coupled state (i.e. allowing a trailer to be "unhooked" from the fifth wheel coupling 16 of the prime mover 10), the assembly 102 ensures that the trailer's park brakes 20 cannot be released until such time as the fifth wheel coupling 16 is correctly engaged to the pin 15, thereby preventing movement of the attached trailer 14.

When in the decoupled state, the auxiliary park brake assembly 102 may additionally or alternatively (in which case the auxiliary park brake assembly would instead be referred to as an auxiliary warning assembly) actuate an alarm module that causes an audible or visible alarm to be output for alerting the driver that the trailer 14 is no longer coupled to the prime mover 10. The alarm module is further configured such that one or more predefined decoupling safety steps must be taken before the alarm is shut off.

Figure 4:
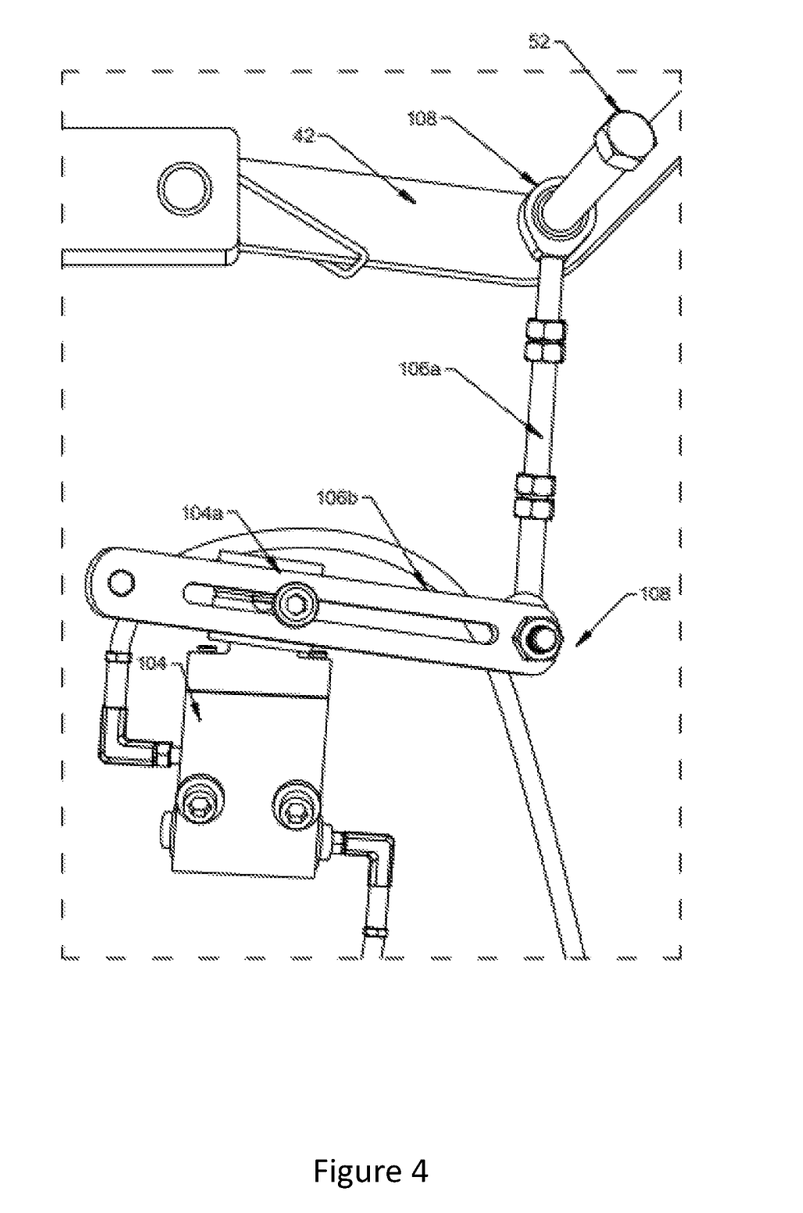
FIG. 4 is a close-up view of the actuator arrangement shown in FIGS. 2 and 3.

FIG. 4 is a close-up view of the actuator 104a shown in FIGS. 2 and 3. The actuator 104a is configured to mechanically couple to any part of the fifth wheel coupling 16 that is caused to move laterally within the body between the coupled and uncoupled states. According to the illustrated embodiment, the actuator 104a is coupled to the auxiliary lock 42 and more particularly to the cam follower pin 52.

In more detail, the auxiliary park brake assembly 102 comprises a normally closed pneumatic shut off valve (PSOV) 104 incorporating a swivel lever or rotary actuator 104a. According to the illustrated embodiment, the actuator 104a comprises a roller lever valve. It will be appreciated, however, that other forms of actuator (e.g. a linear actuator) may be used to control the PSOV 104 depending on the way in which the actuator couples to the auxiliary lock. The actuator 104a is coupled to the follower pin 52 by way of a lever arrangement 106, such that the PSOV 104 is controlled to open when the auxiliary lock 42 is in the disengaged state and close (i.e. return to its non-actuated state) when the auxiliary lock is in the engaged state. As shown, the lever arrangement 106 comprises a first arm portion 106a with rose joints 108 on either end. A first rose jointed end is rotatably coupled to the follower pin 52, while the other end is rotatably coupled to a second arm portion 106b by way of a threaded nut. The second arm portion 106 has a longitudinally extending opening that is configured to couple to the actuator 104a by way of a suitable fastener 107 (in this case taking the form of a screw that screws into a threaded opening in the actuator 104a). The fastener can be fastened at any point along the opening for fine tuning the operation of the actuator 104a.

Figure 5:
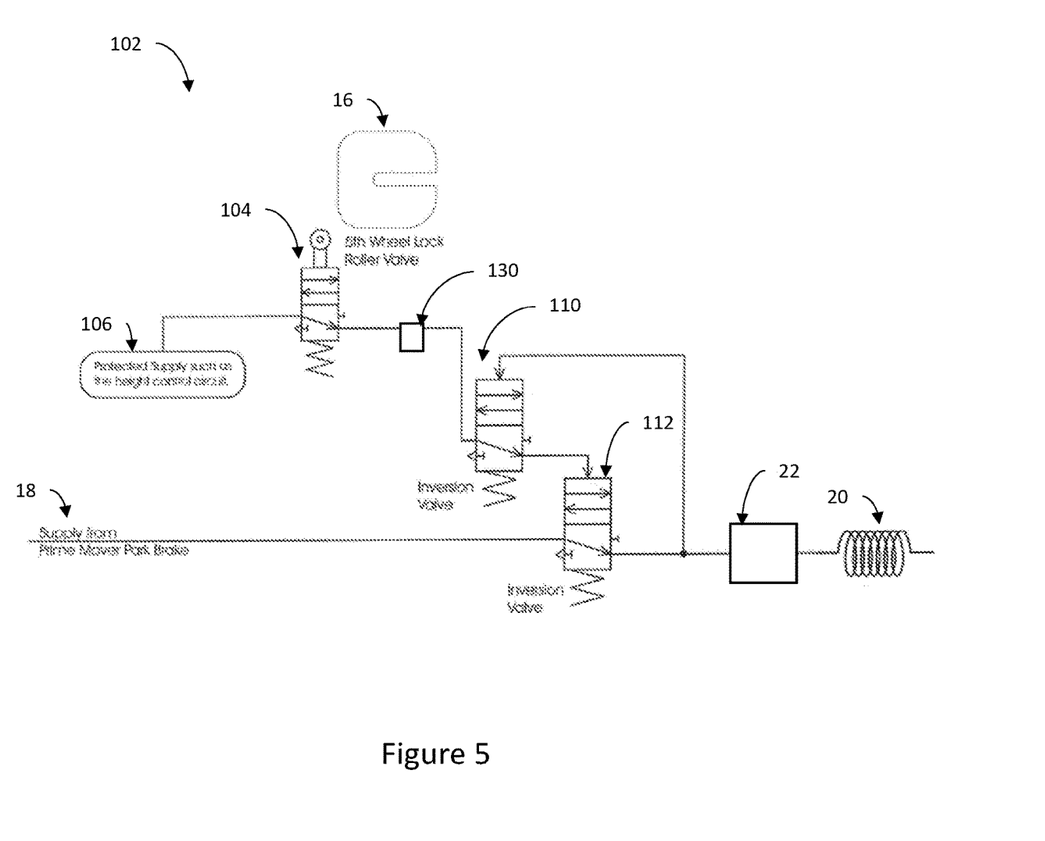
FIG. 5 is a pneumatic circuit diagram illustrating operation of the auxiliary park brake module, in accordance with an embodiment.

FIG. 5 is a circuit schematic illustrating how the auxiliary park brake assembly 102 is configured to selectively interrupt/vent supply of pressurised air to the trailer park brakes 20, as will now be described.

As shown in FIG. 5, the PSOV 104 of the auxiliary park brake assembly 102 has an input port that is fluidly connected to a constant protected pressurised air supply 106. According to the illustrated embodiment, the protected pressurised air supply 106 is taken from the cab side height control circuit, although it will be understood that any suitable protected air supply originating from the prime mover 10 is suitable. An output port of the PSOV 104 is pneumatically coupled to an input port of a first pneumatic inversion valve (PIV) 110. An output port of the first PIV 110 is pneumatically coupled to a control port of a second PIV 112. The second PIV 112 is fluidly connected between the park brake air supply 18 and the one or more trailer park brakes 20 (i.e. such that the input port of the second PIV 112 is connected to the air supply 18 and the output port is connected to the air supply for the one or more trailer park brakes 20). The output of the second PIV 112 is also pneumatically coupled to a control port for the first PIV 110. According to the illustrated embodiment, the auxiliary park brake assembly 102 is located up-stream of the park brake circuit 22.

Operation of the park brake valve assembly 102 will now be described.

When the handle 48 of the coupling 16 is pulled back (i.e. for opening the jaws 36), the auxiliary lock 42 is deflected causing the roller lever 104a to rotate and thereby open the normally closed PSOV 104. This allows air (from the constant supply 106) to flow out of the output port and into the input port of the first PIV 110.

This air travels straight through the normally open PIV 104 and into the control port of the second PIV 112. This in turn causes the second PIV 112 to move to a closed state, preventing air supply 18 from reaching the trailer park brakes 20 making the trailer unmovable.

Once the jaws 36 have closed in a successful trailer 14 hookup, the auxiliary lock 42 springs back to its engaged position (i.e. blocking the yoke 38 from unintentionally moving forward). This causes the actuator 104a to rotate in the opposite direction, in turn causing the PSOV 104 to return to its normally shut off state, blocking the air supply 106 to the first PIV 110 and exhausting any pressure that remains in the line to the first PIV 110. Since there is no longer any air to the control port of the second PIV 112, the PIV 112 returns to its normally open state returning line pressure to the brakes 20, thereby allowing the trailer park brakes 20 to be released. Further, once air is flowing through the second PIV 112, a signal line feeds the same air back into the control port of the first PIV 110. This action stops any chance of air passing through the first PIV 110 and blocking air in the second PIV 112 valve going to the trailer. This means the trailer's park brakes 20 cannot be applied by malfunction once they have been successfully released and the vehicle is in motion.

As previously mentioned, the assembly 102 can additionally or alternatively cause a visual and/or audible alarm to be output once the coupling 16 has been de-coupled. According to one embodiment, a normally-open air pressure switch 130 is disposed in the air line which connects the output port of the PSOV 104 to the input port of the first PIV 110.

Figure 6:
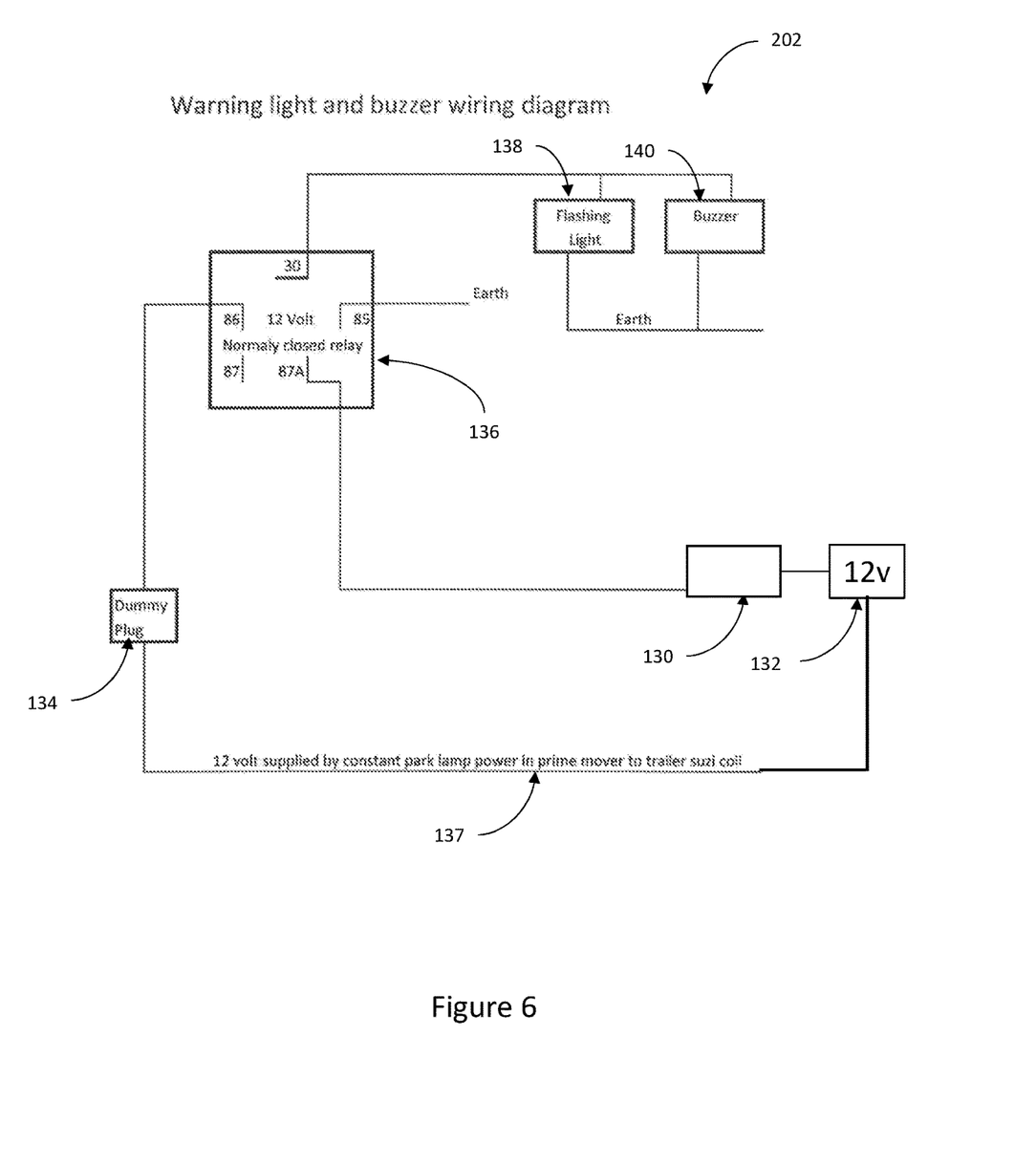
FIG. 6 is an electrical circuit diagram illustrating operation of the alarm circuit, in accordance with an embodiment.

The air pressure switch 130 is electrically disposed within an alarm circuit 202, as shown in FIG. 6. As shown, a positive terminal of a 12-volt supply 132 is connected an input terminal of the air pressure switch 130. According to the illustrated embodiment, the 12-volt supply 132 is supplied from the prime mover 10 and configured to deliver a constant supply of 12 volts to power park lamps on the trailer 14. The supply 132 is electrically connected to a supply lead 137, such as a suzi coil, that plugs into a distribution circuit on the trailer 14 for delivering power to the park lamps. The suzi coil may, for example, be fitted with a 7-pin plug or other suitable plug/socket for connecting to a corresponding plug/socket electrically coupled to the distribution circuit on the trailer 14.

An output terminal of the air pressure switch 130 is connected to a normally closed contact terminal 87A of a normally closed relay 136, such as a conventional 12-volt automotive relay. Terminal 86 is connected to a dummy plug 134, which takes the same form as the plug/socket electrically coupled to the distribution circuit on the trailer. More particularly, the terminal 86 of the relay 136 is connected to a terminal of the plug 134 that would, if connected to the supply lead 137, receive a positive 12-volt signal from the circuit 133. The dummy plug 134 is disposed on the prime mover 10. Terminal 85 of the relay 136 is connected to ground of the 12-volt supply 132. Common connection terminal 30 of the relay 136 is connected in parallel to a positive terminal of a strobe light 138 and buzzer 140, respectively. Negative terminals of the strobe light 138 and buzzer 140 are connected to ground of the 12-volt supply 132. The strobe light 138 and buzzer 140 are positioned in a location that can readily be observed by a driver/operator, such as in the cab 12. It will be understood that a voltage reducer may be suitably incorporated into the circuit 202 where it is to be powered by a 24-volt supply, as found in some models of truck.

Operation of the alarm circuit 202 will now be described. When the fifth wheel hitch 16 is decoupled, air pressure in the control line to the first PIV 110 creates a circuit in the pressure switch 130 that in turn allows current to be delivered to the light 138 and buzzer 140 via the relay 136. This warns the operator that the trailer 14 is unhooked and the turntable jaws 36 are in the unlocked position. To stop the light 138 and buzzer 140, the operator is required to plug the trailer lighting cable 137 into the dummy plug 134 at the rear of the prime mover 10. Once the trailer lighting cable 137 is plugged in the dummy plug 134, a triggering voltage is delivered to the relay 136 causing it to energise and switch, thereby preventing power to pass from the supply 132 to the light 138 and buzzer 140. This action also has the secondary effect of prompting the driver to check that they have disconnected other leads, air lines etc, prior to pulling away from an unhooked trailer 14.

In an alternative configuration to that described above, the prime mover 10 may be connected to a "B double" lead trailer. In this configuration, an additional air line 17, dummy plug 134 and supply lead 137 may be disposed at the rear of the lead trailer 14. Further, it will be understood that a second fifth wheel coupling 16 could be disposed at the rear of the lead trailer and that the second fifth wheel coupling could incorporate an auxiliary park brake assembly for providing the same protection against moving as described above for a single trailer.

It can be seen that certain embodiments have at least one or more of the following advantages: (1) to prevent operator or property injury as a result of a trailer moving unintentionally as a result of an unsuccessful hook-up; (2) to prevent damage of lines and hoses to a trailer that were inadvertently left connected after unhitching from a trailer; (3) to prevent damage of lines and hoses to a trailer that are connected to a trailer that has not been successfully hitched.

While the aforementioned tractor unit 10 took the form of a prime mover, it will be understood that the safety apparatus is suitable for use with any vehicle or trailer (including a b-double trailer) mounting a fifth wheel coupling 14 and capable of pulling a trailered load. Said vehicle may be a large commercial vehicle, a light goods vehicle, a heavy goods vehicle, a waste collection vehicle or the like.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower," "above" and "below" and the like are used as words of convenience to provide reference points and are not to be construed as limiting terms.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

In this specification, the word "comprising" is to be understood in its "open" sense, that is, in the sense of "including", and thus not limited to its "closed" sense, that is the sense of "consisting only of." A corresponding meaning is to be attributed to the corresponding words "comprise," "comprised," and "comprises" where they appear.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The drawings are not necessarily to scale, and the dimensions, shapes, and sizes of the features may differ substantially from how they are depicted in the drawings.

The preceding description is provided in relation to several embodiments that may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

I claim:

1. A safety apparatus for a fifth wheel coupling having locking jaws arranged to detachably couple to a trailer having spring applied air brakes, the fifth wheel coupling comprising a locking component that is moveable between a first position whereat the locking jaws are in a coupled state and a second position whereat the locking jaws are in a decoupled state, the safety apparatus comprising:
    a pneumatic valve arrangement that is pneumatically coupled to both (a) a constant air pressure supply, and (b) an air park brake supply line that supplies pressurised air to the spring applied air brakes; and
    a mechanical actuator that is mechanically coupled to the locking component and configured to mechanically actuate the pneumatic valve arrangement when the locking component moves from the first position to the second position, thereby causing the pneumatic valve arrangement to block flow in the air park brake supply line for preventing the spring applied air brakes from releasing,
    wherein the pneumatic valve arrangement comprises a pneumatic shut off valve (PSOV) having an input port pneumatically coupled to the constant air pressure supply and an output port pneumatically coupled to a pneumatic inversion valve (PIV) configuration, and wherein the PIV is pneumatically coupled to the air park brake supply line.

2. A safety apparatus in accordance with claim 1, wherein the PSOV is a normally closed PSOV.

3. A safety apparatus in accordance with claim 2, wherein the mechanical actuator is further configured such that when the locking component returns to the first position, the actuator causes the PSOV to return to a normally closed state, in turn allowing the pressurised air in the air park brake supply line to reach the spring applied air brakes causing them to release.

4. A safety apparatus in accordance with claim 3, wherein the PIV configuration is pneumatically coupled to the air park brake supply line upstream of a spring valve coupled to the spring applied air brakes.

5. A safety apparatus in accordance with claim 4, wherein the PIV configuration comprises a first PIV having an input port pneumatically coupled to the output port of the PSOV and an output port pneumatically coupled to a control valve of a second PIV and whereby an input port of the second PIV is pneumatically coupled to a supply side of the air park brake supply line and an output port of the second PIV is pneumatically coupled to a brake side of the air park brake supply line.

6. A safety apparatus in accordance with claim 5, wherein the output port of the second PIV is additionally pneumatically coupled to a control input for the first PIV.

7. A safety apparatus in accordance with claim 2, wherein the locking component comprises an auxiliary lock which is pivotally mounted inside a body of the fifth wheel coupling.

8. A safety apparatus in accordance with claim 7, wherein the auxiliary lock is movable between the first and second position by way of a cam plate and wherein when in the first position the auxiliary lock is configured to bear on a locking yoke to prevent lateral displacement of the locking yoke.

9. A safety apparatus in accordance with claim 7, wherein the mechanical actuator is a rotary actuator connected to the PSOV and wherein the rotary actuator is coupled to the auxiliary lock by way of a lever.

10. A safety apparatus in accordance with claim 9, wherein the lever comprises one or more rose joints that couple to at least one of the mechanical actuator and the auxiliary lock.

11. A safety apparatus in accordance with claim 2, wherein the PSOV is located within a body of the fifth wheel coupling.

12. A safety apparatus in accordance with claim 2, wherein the pneumatic valve arrangement further comprises a pressure switch that, when actuated, is configured to either open or close an electrical circuit in an alarm circuit causing an alert indicator electrically coupled to the alarm circuit to output at least one of an audible and visible alarm and wherein actuation of the mechanical actuator results in the pressure switch being be actuated and wherein the pressure switch is actuated by air pressure output through the output port of the PSOV.

13. A safety apparatus in accordance with claim 1, wherein the constant air pressure supply is a protected supply.

14. A safety apparatus in accordance with claim 1, wherein the pneumatic valve arrangement further comprises a pressure switch that, when actuated, is configured to either open or close an electrical circuit in an alarm circuit causing an alert indicator electrically coupled to the alarm circuit to output (i) an audible alarm, (ii) a visible alarm, or (iii) both (i) and (ii), and wherein actuation of the mechanical actuator results in the pressure switch being be actuated.

15. A safety apparatus in accordance with claim 14, wherein the alert indicator is positioned in a cockpit of a tractor attached to the fifth wheel coupling.

16. A safety apparatus in accordance with claim 15, wherein the alarm circuit is electrically connected to an electrical socket located on the tractor and wherein the alarm circuit is configured such that insertion of a plug attached to a powered trailer lighting electrical cable into the socket ceases at least one of the audible alarm or visible alarm.

17. A safety apparatus for a fifth wheel coupling having locking jaws arranged to detachably couple to a trailer having spring applied air brakes, the fifth wheel coupling comprising a moveable auxiliary locking component that, when in an engaged position, prevents the locking jaws from opening and wherein the auxiliary locking component can only move into the engaged position once the jaws have successfully closed, the safety apparatus comprising:
 a pneumatic valve arrangement that is pneumatically coupled to both (a) a constant air pressure supply, and (b) an air park brake supply line which supplies pressurised air to the spring applied air brakes for releasing the park brakes; and
 a mechanical actuator that is mechanically coupled to the auxiliary locking component and configured to mechanically actuate the pneumatic valve arrangement when the auxiliary locking component moves from the engaged position to a disengaged position, thereby causing the pneumatic valve arrangement to prevent the pressurised air supply from reaching the spring applied air brakes,
 wherein the pneumatic valve arrangement comprises a pneumatic shut off valve (PSOV) having an input port pneumatically coupled to the constant air pressure supply and an output port pneumatically coupled to a pneumatic inversion valve (PIV) configuration, and wherein the PIV is pneumatically coupled to the air park brake supply line.

* * * * *